Sept. 5, 1961  D. H. BAKER  2,998,727
HEADING REFERENCE SYSTEM FOR NAVIGABLE CRAFT
Filed March 24, 1959
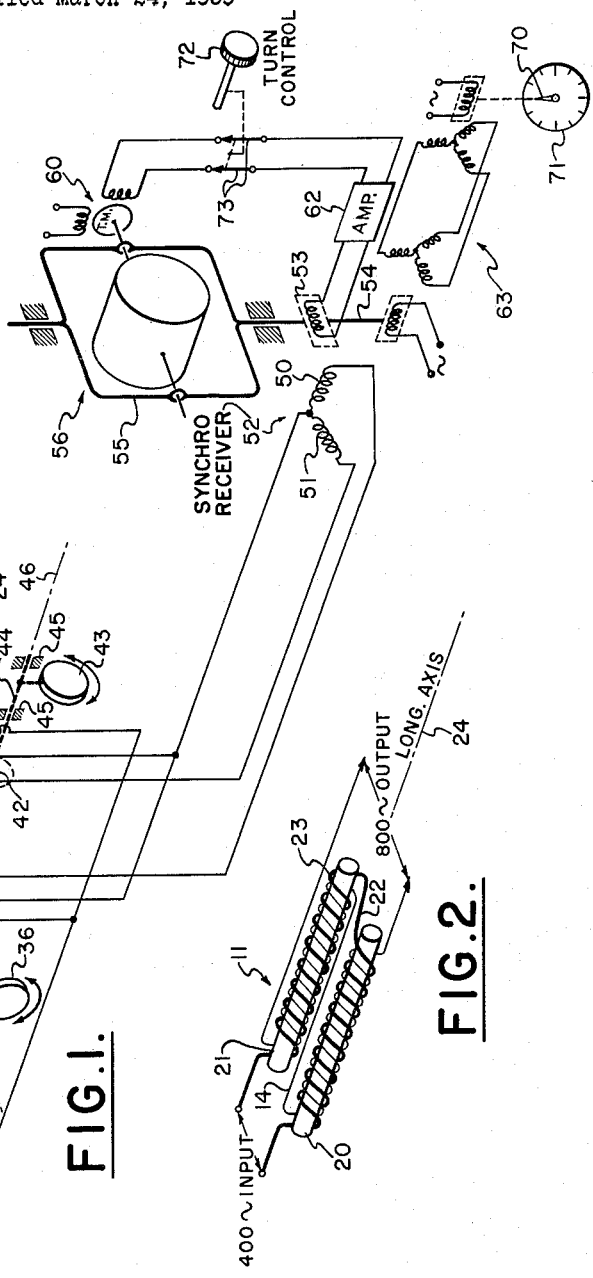
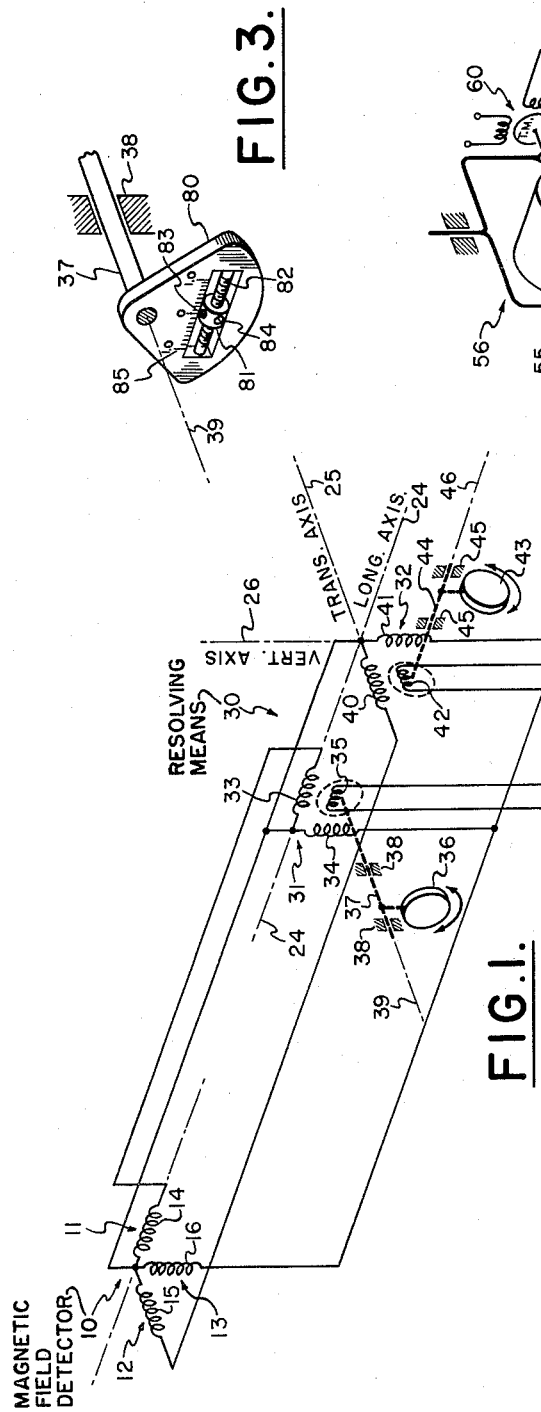
INVENTOR
DONALD H. BAKER
BY
ATTORNEY United States Patent Office 2,998,727
Patented Sept. 5, 1961

2,998,727
HEADING REFERENCE SYSTEM FOR
NAVIGABLE CRAFT
Donald H. Baker, Mount Vernon, N.Y., assignor to Sperry Rand Corporation, Great Neck, N.Y., a corporation of Delaware
Filed Mar. 24, 1959, Ser. No. 801,611
13 Claims. (Cl. 74—5.4)

This invention relates to systems which are responsive to the earth's magnetic field and more particularly to heading reference systems for navigable craft.

The purpose of this invention is to provide an accurate heading reference system that utilizes a magnetic field detector which is better suited to the demands of modern navigable craft, particularly high speed aircraft, than previous detectors. Previously, two techniques have dominated the design of magnetic field detectors for navigable craft, that is, the detectors have been either gyro stabilized or pendulous in order to measure only the horizontal components of the earth's magnetic field.

Known gyro stabilized magnetic field detectors consist of a detecting element which is maintained in a horizontal plane with respect to the earth by mounting it on a vertical gyro or gyro stabilized platform. This arrangement has numerous disadvantages including:

(1) The device is too cumbersome to be mounted in many desirable locations, such as wing tips, remote from magnetic fields due to the aircraft which affect the detecting abilities of the detector;

(2) The temperature range within which the unit will operate satisfactorily is limited by the structure of the vertical gyro or gyro stabilized platform;

(3) Magnetic fields due to the gyro itself makes good definition of the earth's magnetic field difficult;

(4) Vertical gyros are subject to continuous errors in verticality because the erection system must operate on a finite error. The verticality errors in the gyro are amplified by the tangent of the dip angle thereby producing large compass errors; and, (5) The device is complicated and not suitable to exposure to vibrations and shock of a substantial amplitude.

Conventional pendulous detectors, on the other hand, while smaller and more accurate, are still considerably larger than desirable for installation in the thin wing or fin sections of modern aircraft and missiles. Further, because of the high skin temperatures reached in modern aircraft which may exceed 600° F. in the wing section and aerodynamic buffeting of the wing, pendulous type detectors are objectionable because:

(1) The damping fluid used therein cannot be maintained at the proper viscosity over the temperature range encountered;

(2) The suspension elements of the pendulous type detector lose their desirable metallurgical qualities at the elevated temperatures encountered; and, (3) The pendulous suspension is not adapted for the vibration or shock encountered in a wing tip installation of a modern aircraft.

Also, the flexible electrical leads of a pendulous detector produce spring restraint on the pendulum causing it to be tilted instead of level at large attitude angles of the aircraft.

It is a primary object of the present invention to provide a heading reference system for navigable craft utilizing a magnetic field detector suitable for modern navigable craft.

It is another object of the present invention to provide a heading reference system which measures the direction and strength of the earth's total magnetic field.

It is a further object of the present invention to provide a heading reference system which is more accurate and adaptable for modern high speed aircraft.

The above objects are achieved by the heading reference system of the present invention by utilizing a magnetic field detector fixedly mounted in the wing or other suitable location remote from disturbing magnetic fields which consists of three orthogonally arranged magnetometer elements that are disposed parallel to the longitudinal, transverse and vertical axes, respectively, of the craft. The direction and strength of the earth's total magnetic field is detected by said detector and applied to resolvers, preferably mounted in the fuselage of the aircraft, which produce signals representative of the direction and strength of the components of the earth's magnetic field in a plane that is horizontal with respect to the earth. The resultant of said last-mentioned signals is utilized to provide a signal representative of the heading of the craft. In certain embodiments of the present invention, the heading reference signal may be utilized in conjunction with a directional gyro for precessing said gyro to eliminate the error between the azimuthal orientation of the gyro and the heading reference signal as in a gyromagnetic compass system.

The present invention will now be described with reference to the accompanying drawings wherein:

FIG. 1 is a schematic diagram of a preferred embodiment of the present invention as applied to a gyromagnetic compass system;

FIG. 2 is a schematic diagram of a magnetometer element which may be utilized in the system of FIG. 1; and, FIG. 3 is a perspective view of an adjustable pendulum which may be utilized in the system of FIG. 1.

In the following description, references to axes and planes are with respect to the aircraft unless otherwise indicated.

Referring now to FIG. 1, a preferred embodiment of the present invention will be described with respect to a heading reference system that is adaptable for use in aircraft. Although the present invention will be described for purposes of example with respect to aircraft, it will be understood that the system is equally adaptable to other types of navigable craft. The system of FIG. 1 includes a magnetic field detector 10. Detector 10 consists of magnetometer elements 11, 12 and 13 that are arranged mutually perpendicular with respect to each other, the combination of which is disposed to be responsive to the earth's total magnetic field and to provide signals representative thereof as described below. For purposes of simplicity, only the output or secondary windings 14, 15 and 16 of the respective magnetometer elements 11, 12 and 13 are shown in FIG. 1.

Each of the magnetometer elements, such as magnetometer element 11 shown in FIG. 2, may consist of a pair of spaced, parallel cores 20 and 21 of magnetically permeable material on which are wound separate primary or excitation windings 22 and 23 connected in series opposition. As shown, output or secondary winding 14 consists of a pair of windings wound in series aiding about core members 20 and 21 and about primary windings 22 and 23. Alternatively, output winding 14 may consist of a single winding wound about both core members 20 and 21 and about primary windings 22 and 23. The primary windings 22 and 23 may be connected to be energized by a 400 cycle potential.

In operation, as the positive half-cycle of the exciting potential builds up in primary windings 22 and 23 of magnetometer element 11, the reluctance of the cores 20 and 21 with respect to the surrounding air is increased, causing the earth's magnetic field, which is concentrated in cores 20 and 21, to return to its normal parallel paths. In so doing, the earth's field cuts output winding 14, inducing current of one polarity therein. As the positive half-cycle of the exciting potential decays, the earth's field is again concentrated in the cores 20 and 21 because of the lower reluctance of the cores 20 and 21 with respect to the surrounding air. In so doing, the earth's field again cuts output winding 14, inducing a current of opposite polarity therein. Thus, each half-cycle of the exciting potential produces one full cycle of induced current. The negative half-cycle of the exciting potential reproduces the action of the positive half-cycle. Therefore, the frequency of the current produced in output winding 14 is 800 cycles per second or double that of the exciting potential. The amplitude of the induced current in output winding 14 varies in accordance with the number of magnetic lines cutting winding 14. With magnetometer element 11 disposed parallel to the longitudinal axis 24 of the aircraft, as shown in FIGS. 1 and 2, the amplitude of the induced current in output winding 14 is proportional to the component of the earth's magnetic field parallel to longitudinal axis 24.

Referring again to FIG. 1, magnometer element 12 is disposed parallel to the transverse axis 25 of the aircraft in order that its output winding 15 provides an output proportional to the component of the earth's magnetic field parallel to transverse axis 25. Magnetometer element 13 is disposed parallel to the vertical axis 26 in order that its output winding 16 provides an output proportional to the component of the earth's magnetic field parallel to the vertical axis 26. With detector 10 having its magnetometer elements 11, 12 and 13 so disposed, it is responsive to the earth's total magnetic field.

Preferably, detector 10 should be responsive only to the earth's magnetic field and it should, therefore, be mounted within the aircraft at a location where there are a minimum of disturbing magnetic fields. The most desirable location for mounting detector 10 is either in the wing tip or in the rudder as far as possible from the fuselage and engines. In modern high speed aircraft, when the detector 10 is mounted in either one of the aforementioned locations, it is subjected to extremely high temperatures of from 600° F. to 700° F. which render conventional detectors inoperative. The detector is also subjected to extremes in vibration due to buffeting which necessitates that the detector 10 be mounted fixed with respect to the aircraft and be extremely rugged in order to operate effectively in spite of the above conditions. Further, the wing and rudder sections at the desirable locations are extremely thin, thus limiting the dimensions of the detector 10.

The detector 10 of the present invention may be constructed of three small magnometer elements 11, 12 and 13 orthogonally disposed with respect to each other and encased in a high temperature casting resin or ceramic in order to provide accurate signals although subjected to the above conditions. A typical detector, for example, may be constructed to include six K-Monel bobbins, each about ¾" long and fabricated out of a ⅟₁₆" I.D. by .010" thick slit tube and ¼" diameter by .062" thick end plates. Each bobbin is coated with a ceramic for insulation. Two windings of 1500 turns each of #42 ceramic coated magnet wire may be wound on each bobbin to form the primary and secondary windings. These windings terminate in eyelet type terminals in a fiberglass wrap. An annealed pure iron rod of about ⅟₁₆" diameter is inserted into each of the bobbins to provide a high permeability core. The six bobbins may be mounted on a K-Monel frame with the bobbins grouped in pairs and aligned with the longitudinal transverse and vertical axes of the aircraft.

Each of the output windings 14, 15 and 16 of detector 10 produces a voltage of given amplitude depending upon its position relative to the earth's total magnetic field; thus, the signals from windings 14, 15 and 16 depend upon the strength of the total field, the aircraft heading and the attitude of the aircraft. In order to provide signals representative of the direction and strength of the earth's magnetic field in a plane that is horizontal with respect to the earth at the location of the aircraft, resolving means 30 is mounted within the aircraft in a manner to be described and it is connected to be responsive to the signals from the detector 10. Resolving means 30 consists of resolvers 31 and 32 which are preferably mounted in a protected area within the fuselage and remotely located with respect to detector 10.

The output windings 14 and 16 of detector 10 are connected to the corresponding stator windings 33 and 34, respectively, of resolver 31. Stator winding 33 is disposed perpendicular to stator winding 34. For convenience of explanation, in the preferred embodiment of the invention shown in FIG. 1, stator winding 33 is shown aligned with or parallel to the longitudinal axis 24 and stator winding 34 is shown aligned with or parallel to vertical axis 26. As will become apparent, the stator windings 33 and 34 may be disposed other than aligned with or parallel to the axes 24 and 26, respectively. The rotor winding 35 of resolver 31 is disposed normally parallel to stator winding 33 and perpendicular to stator winding 34. In order to maintain the rotor winding 35 horizontal with respect to the earth when the aircraft pitches with respect to transverse axis 25, a pendulum 36 is pivoted about an axis 39 that is parallel to transverse axis 25 and is connected by shaft 37 to maintain rotor winding 35 stationary as the aircraft rotates with respect to it. In the embodiment shown, rotor winding 35 is rotatable about axis 39 in the plane defined by stator windings 33 and 34 by means of spaced bearings 38, 38 mounted on the aircraft frame which rotatably support shaft 37. In effect, this renders the rotor winding 35 pendulous and stabilizes it with respect to the gravity vertical.

The output windings 15 and 16 of detector 10 are connected to the corresponding stator windings 40 and 41, respectively, of resolver 32. Stator winding 40 is disposed perpendicular to stator winding 41. For convenience of explanation, stator winding 40 is shown aligned with or parallel to the transverse axis 25 and stator winding 41 is shown aligned with or parallel to the vertical axis 26. As will become apparent, the stator windings 40 and 41 may be disposed other than aligned with or parallel to the axes 25 and 26, respectively. The rotor winding 42 of resolver 32 is disposed normally parallel to stator winding 40 and perpendicular to stator winding 41. In order to maintain the rotor winding 42 horizontal with respect to the earth when the aircraft rolls with respect to longitudinal axis 24, a pendulum 43 is pivoted about an axis 46 that is parallel to longitudinal axis 24 and is connected by shaft 44 to maintain rotor winding 42 stationary as the aircraft rotates with respect to it. In the embodiment shown, rotor winding 42 is rotatable about axis 46 in the plane defined by stator windings 40 and 41 by means of spaced bearings 45, 45 mounted on the aircraft frame which rotatably support shaft 44. In effect, this renders the rotor winding 42 pendulous and stabilizes it with respect to the gravity vertical.

The rotor windings 35 and 42 of resolvers 31 and 32, respectively, are connected to the corresponding stator windings 50 and 51, respectively, of synchro receiver 52. Synchro receiver 52 is mounted on the craft with its stator windings 50 and 51 horizontally disposed and mutually perpendicular. The voltages from rotor windings 35 and 42 are applied to stator windings 50 and 51, respectively, to induce currents in the stator of synchro receiver 52 which create a magnetic vector representative of the magnetic heading of the aircraft. The voltages from the stator of synchro receiver 52 induce a corresponding voltage in its rotor winding 53, the amplitude and phase of which depends upon the relative positions of the stator and rotor windings in a manner to be more fully described. Rotor 53 is mounted on the lower vertical shaft 54 of the vertical gimbal ring 55 of directional gyro 56.

The voltages in stator windings 50 and 51 of synchro receiver 52 establish a magnetic vector which varies in position across its stator in the same relationship as the magnetometer elements 11, 12 and 13 vary in their orientation to the earth's magnetic field. When rotor winding 53 is at right angles to this vector, no voltage is induced therein, such condition being referred to herein as the zero signal condition or zero signal relation of the rotor and vector. Whenever the rotor and the vector are at any other relative angle to one another, a voltage is developed in rotor winding 53 that varies in amplitude proportionally to the magnitude of the angular displacement between the reference direction provided by the directional gyroscope and the magnetic reference direction provided by detector 10, and varies in phase in accordance with the sense or direction of such angular displacement. This voltage may be referred to as the error signal.

This error signal is amplified and phase detected in amplifier 62 in a manner more fully described in Patent No. 2,808,656, issued October 8, 1957, to A. D. Pirone, entitled "Gyromagnetic Reference Systems," and is applied to torque motor 60 of gyro 56 whereby a precessing torque is applied to gyro 56. As the gyro precesses, it rotates vertical ring 55 to bring the rotor 53 of synchro 52 into its zero signal relation with the vector in the stator thereof thereby stopping generation of voltage in the rotor 53 and halting the action of torque motor 60. Should the spin axis of gyro 56 drift in azimuth during flight, a similar action takes place. Conversely, a zero signal relationship between the rotor winding 53 and the magnetic vector is maintained during turns by the rotation of stator windings 50 and 51, which turn with the aircraft, about the axis of rotation of stabilized vertical ring 55 and rotor winding 53. Thus, synchro receiver 52 constitutes a means for comparing the gyroscopic and magnetic reference directions and for generating precessing control signals that vary in phase and amplitude in accordance with differences in the sense and magnitude of variations between said directions.

In the arrangement disclosed, it may be noted that the rotor winding 53 of synchro receiver 52 is fixed in azimuth relative to the spin axis of the directional gyro 56. However, it is apparent that other arrangements may be desirable, for example, as shown in patent application Serial No. 557,530, filed January 5, 1956, and now Patent No. 2,898,690, entitled, "Quick Setting Means for Gyromagnetic Compass" of W. P. Colistra.

The system described in the instant application provides a magnetic meridian reference which, by means of suitable pick-offs on the directional gyro may be used, for example, for yaw control of an automatic pilot for an aircraft or missile. When visual indication of the magnetic meridian is required, the system may be adapted, as in above-mentioned patent application Serial No. 557,530, or as in Patent No. 2,574,471 entitled, "Gyromagnetic Compass," issued to C. F. Fragola on November 13, 1951, to provide such indication on the face of the directional gyro unit. Frequently, it is preferred to have such indication at one or more locations remote from the gyro 56. For this purpose, a synchro data transmission system 63 may be responsive to the movement of shaft 54 and connected to position pointer 70 relative to a suitably calibrated dial 71 to provide a visual indication of aircraft heading relative to the magnetic meridian.

During turns of the aircraft, pendulums 36 and 43 are subjected to acceleration forces which tend to render the information supplied by resolvers 31 and 32 inaccurate. During this time, it is desirable to operate the directional gyro 56 as a free gyro to avoid slaving it to an erroneous position. A conventional means of rendering the slaving error signal ineffective is indicated as being initiated by operation of the turn control knob 72 which is connected to disconnect the output of the amplifier 62 to the torque motor 60 by opening switches 73. Any other suitable means of disconnecting the output of the amplifier during turns or when the pendulums 36 and 43 are subjected to accelerations is acceptable, for example, by utilizing a rate gyro.

In operation, the voltages proportional to the components of the earth's magnetic field along the aircraft's axes that are detected in detector 10 are applied to resolving means 30. Specifically, the voltage proportional to the component of the earth's magnetic field along the aircraft's longitudinal axis 24 that is detected in output winding 14 is applied to stator winding 33 while the voltage proportional to the component of the earth's magnetic field along the aircraft's vertical axis 26 that is detected in output winding 16 is applied to stator winding 34. Similarly, the voltage proportional to the components of the earth's magnetic field along the aircraft's transverse axis 25 that is detected in output winding 15 is applied to stator winding 40 while the voltage proportional to the components of the earth's magnetic field along the aircraft's vertical axis 26 that is detected in output winding 16 is applied to stator winding 41. The direction and strength of the magnetic field in the stator windings 33 and 34 of resolver 31 is representative of the vector addition of the components of the earth's magnetic field in the plane defined by the longitudinal axis 24 and the vertical axis 26. Similarly, the direction and strength of the magnetic field in the stator windings 40 and 41 of resolver 32 is representative of the vector addition of the components of the earth's magnetic field in the plane defined by the transverse axis 25 and the vertical axis 26. With the aircraft in level flight such that the longitudinal and transverse axes 24 and 25 of the aircraft are horizontal with respect to the earth, the rotor winding 35 has induced therein a voltage representative of the horizontal component only of the earth's magnetic field in the plane defined by the longitudinal and vertical axes 24 and 26 since, with rotor winding 35 parallel to stator winding 33 and perpendicular to stator winding 34, there is maximum coupling between rotor winding 35 and stator winding 33 and effectively zero coupling between rotor winding 35 and stator winding 34. The signal induced in rotor winding 35 is representative of the cosine of the magnetic heading of the aircraft.

Correspondingly, rotor winding 42 has induced therein a voltage representative of the horizontal component only of the earth's magnetic field in the plane defined by the transverse and vertical axes 25 and 26 which is proportional to the sine of the heading. The signals from rotor windings 35 and 42 are applied to stator windings 50 and 51, respectively, of synchro receiver 52 to provide a magnetic vector in its stator representative of the magnetic heading. As explained above, whenever the rotor winding 53 and the magnetic vector in the stator of synchro receiver 52 are not perpendicular with respect to each other, an error voltage is developed in rotor winding 53 which is amplified in amplifier 62 and applied to the torque motor 60 to return the directional gyro 56 in azimuth to the proper azimuthal position.

When the attitude of the aircraft is other than level, for example, when the aircraft is climbing and pitched up, the voltages detected in output windings 14 and 16 of detector 10 change as known functions of the aircraft attitude since the detector 10 is fixed with respect to the aircraft and moves with it, which, in turn, moves with respect to the earth's magnetic field. The stator windings 33 and 34 of resolver 31 also move with the aircraft and with respect to rotor winding 35 which remains horizontal with respect to the earth due to the action of pendulum 36. Although the voltages detected by output windings 14 and 16, respectively, have different magnitudes, the magnetic vector detected by these windings remains fixed since it is fixed in space and the airplane has rotated with respect to it. Consequently, although the magnitudes of the voltages induced in each of the stator windings 33 and 34 change, the magnetic vector established by these windings remains fixed. With the rotor winding 35 maintained fixed in space by the action of pendulum 36, the rotor winding 35 has induced therein a voltage representative of the cosine of the heading as before.

The magnitude of the voltage induced in output winding 15 remains the same and although the magnitude of the voltage induced in output winding 16 has changed, it has no effect upon the output of resolver 32 because there is effectively zero coupling between stator winding 41 and rotor winding 42 thereof, since the position of stator windings 40 and 41 with respect to rotor winding 42 is unaffected by changes in the pitch attitude of the aircraft.

The voltages applied to the stator windings 50 and 51 of synchro receiver 52 therefore are the same as when the aircraft was in level flight assuming the same heading and geographical location of the aircraft.

Similarly, when the attitude of the aircraft changes in roll, the outputs of the rotor windings 35 and 42 will remain the same, due, in this case, to the action of pendulum 43 and establish in the stator of synchro receiver 52 a magnetic heading as before, again assuming that the heading and geographical location of the aircraft remain the same.

In the embodiment of the invention shown in FIG. 1, the vertical output winding 16 of detector 10 is connected to the correspondingly disposed stator windings 34 and 41 of resolvers 31 and 32, respectively. In order for the system to function accurately, it will be apparent that the inductive loads of each of the synchro transmission systems must be made equal in a conventional manner not shown, for example, by inserting suitable compensating inductive loads therein. An alternative arrangement would be to have separate vertical output windings of detector 10 connected to the respective vertical stator windings 34 and 41 of resolvers 31 and 32.

As shown, the axes of the detector and the respective axes of the resolvers are parallel to each other and are parallel to the corresponding aircraft axes. An error in parallelism, in the embodiment shown, will cause a tilt of the detector or the resolvers which will result in an error in the heading indication which is proportional to the tilt angle and the tangent of the dip angle. Placing both the detector and the resolvers at the same tilt angle or adjusting the pendulums connected to the resolvers in a manner to be described so that the rotors of the resolvers have the same tilt angles will minimize the error and render it negligible.

Misalignment of the detector in azimuth will result in an index error and an additional error which is proportional to the product of the misalignment angle, the pitch or roll angle, and the tangent of the dip angle. Techniques for accurately aligning the detector in azimuth by optical means have been developed in conjunction with electrical compass swinging as disclosed in patent application Serial No. 567,203 of Halpern et al., entitled, "A Method of Measuring and Compensating for Deviation Errors for Earth's Field Responsive Instruments," filed February 23, 1956 and now Patent No. 2,887,872 and patent application Serial No. 567,204 of Halpern et al. entitled, "A Method of Measuring and Compensating for Deviation Errors in Earth's Field Sensitive Direction Indicators," also filed February 23, 1956 and now Patent No. 2,887,873. The detector can be leveled by using a bubble level against machined surfaces on the detector mounting fixture. Utilization of these techniques will satisfactorily reduce detector misalignment errors to a negligible value. The resolver may be aligned in azimuth either by optical means or by mechanical alignment to an indexing mark on the resolver mounting fixture. The resolvers can be leveled by means of a liquid level placed against machined surfaces on the fixture.

The rotors of the resolvers may be aligned by rotation of the stator windings with respect to the rotor or by the use of an adjustable pendulum 80, the latter being shown in FIG. 3. The adjustable pendulum 80 could be used, for example, in lieu of pendulum 36 or 43. As shown in FIG. 3, adjustable pendulum 80 is connected to shaft 37 to rotate about axis 39. Pendulum 80 may be adjusted by means of an adjustable balance weight in the form of a balance nut 81 which is threaded onto threaded shaft 82. Shaft 82 is integral with pendulum 80 and is disposed normally horizontal with respect to the earth. Nut 81 placed on shaft 82 acts as an adjustable balance weight since moving the nut 81 along the shaft 82 changes the balance of pendulum 80. Nut 81 can be locked to shaft 82 by means of set screws 83 and 84. The pendulum may also be calibrated by graduations 85 to indicate the pendulum angle for different positions of the nut 81. The resolver can be adjusted by feeding known signals into the resolver and then adjusting the balance nut 81 until the expected rotor signals are obtained. For example, voltages representative of a pure vertical magnetic field can be fed into the resolver and the balance nut 81 on the pendulum 80 adjusted until a zero output signal results. This technique will render errors due to misalignment of the resolver negligible.

The system of the present invention is subjected to errors which are typical of remote indicating magnetic compass systems. First, permanent magnet fields of the aircraft cause an error which goes through one positive and one negative peak in one complete rotation of the longitudinal axis of the aircraft. This error can be determined by the method disclosed in the aforementioned patent applications Serial Nos. 567,203 and 567,204 and the error thus determined can be compensated by placing magnets near the detector which cancel the disturbing field or by feeding direct currents into the output windings of the detector as disclosed in U. S. Patent No. 2,852,859 of M. C. Depp entitled "Flux Valve Compensating System" issued September 23, 1958. Second, unbalances in the transmission loop impedances or voltage unbalance in the magnetometer elements will cause an error which goes through two positive and negative peaks in each rotation of the aircraft. This error can be compensated by inserting inductances into the transmission loop by means of a transmission error compensator as disclosed in U. S. Patent No. 2,810,102 of M. C. Depp et al. entitled, "Deviation for Compensating a Data Transmission System for Two-Cycle Errors," issued October 15, 1957. Third, Coriolis acceleration causes the roll pendulum to hang-off by an angle proportional to the velocity of the aircraft and the sine of the latitude. The error induced can be corrected by feeding direct current of the proper magnitude into the output winding 15 of the detector to cancel the component of the vertical field picked up by the rotor 42 as disclosed in the aforementioned Depp Patent 2,852,859. Thus, the errors of the system of the present invention can be compensated by using extensions of the aforementioned techniques with respect to the particular embodiment of the invention under consideration.

While the invention has been described in its preferred embodiment, it is to be understood that the words which have been used are words of description rather than limitation and that changes within the purview of the appended claims may be made without departing from the true scope and spirit of the invention in its broader aspects.

What is claimed is:

1. A heading reference system for navigable craft comprising detecting means mounted on said craft for producing first signals representative of the direction and strength of the earth's total magnetic field, resolving means mounted on said craft and responsive to said first signals for producing second signals representative of the direction and strength of the earth's magnetic field in a plane that is horizontal with respect to the earth, and means responsive to said second signals for producing a third signal representative of the heading of said craft.

2. A heading reference system for navigable craft comprising detecting means mounted on said craft for producing first signals representative of the direction and strength of the earth's total magnetic field, resolving means mounted on said craft and responsive to said first signals for producing second signals representative of the direction and strength of the earth's magnetic field in a plane that is horizontal with respect to the earth, and means responsive to said second signals for producing a third signal representative of the direction and strength of the earth's magnetic field in a plane that is horizontal with respect to the earth.

3. A heading reference system for navigable craft comprising detecting means mounted on said craft for producing first signals representative of the direction and strength of the earth's total magnetic field, resolving means mounted on said craft and responsive to said first signals for producing second signals representative of the direction and strength of the earth's magnetic field in a plane that is horizontal with respect to the earth, and means responsive to said second signals for producing a third signal representative of the heading of said craft and the strength of the earth's magnetic field in a plane that is horizontal with respect to the earth.

4. A heading reference system for navigable craft comprising detecting means mounted on said craft having three elements disposed mutually perpendicular to one another and parallel to the longitudinal, transverse and vertical axes, respectively, of said craft for producing first signals representative of the components of the earth's magnetic field along said axes, resolving means mounted on said craft and responsive to said first signals for producing second signals representative of the direction and strength of the earth's magnetic field in a plane that is horizontal with respect to the earth, and means responsive to said second signals for producing a third signal representative of the heading of said craft.

5. A heading reference system for navigable craft comprising detecting means mounted on said craft having three magnetometer elements arranged mutually perpendicular to one another, said elements being disposed parallel to the longitudinal, transverse and vertical axes, respectively, of said craft for producing first signals representative of the components of the earth's magnetic field along said axes, each of said elements includes core means of magnetically saturable material disposed parallel to one of said axes, means for energizing each of said elements so that voltages are induced therein corresponding to the components of the earth's magnetic field parallel to the associated elements, resolving means mounted on said craft and responsive to said first signals for producing second signals representative of the direction and strength of the earth's magnetic field in a plane that is horizontal with respect to the earth, and means responsive to said second signals for producing a third signal representative of the heading of said craft.

6. A system of the character described in claim 5, including adjustable means coupled to said resolving means for compensating for misalignment of said resolving means.

7. A heading reference system for navigable craft comprising detecting means mounted on said craft having three magnetometer elements perpendicularly arranged with respect to each other, said elements being disposed parallel to the longitudinal, transverse and vertical axes, respectively, of said craft for producing first signals representative of the components of the earth's magnetic field along said axes, each of said elements includes core means of magnetically saturable material disposed parallel to one of said axes, means for energizing each of said elements so that said first signals are induced therein corresponding to the components of the earth's magnetic field parallel to the associated elements, first resolving means mounted on said craft and responsive to said first signals from the magnetometer elements disposed parallel to the longitudinal and vertical axes for producing second signals representative of the cosine of the heading of said craft, second resolving means mounted on said craft and responsive to said first signals from the magnetometer elements disposed parallel to the transverse and vertical axes for producing third signals representative of the sine of the heading of said craft, and means responsive to said second and third signals for producing a fourth signal representative of the heading of said craft.

8. A heading reference system for navigable craft comprising detecting means mounted on said craft having three magnetometer elements arranged mutually perpendicular to one another, said elements being disposed parallel to the longitudinal, transverse and vertical axes, respectively, of said craft for producing first signals representative of the components of the earth's magnetic field along said axes, each of said elements includes core means of magnetically saturable material disposed parallel to one of said axes, means for energizing each of said elements so that said first signals are induced therein corresponding to the components of the earth's magnetic field parallel to the associated elements, first resolving means mounted on said craft having a stator responsive to said first signals from the magnetometer elements arranged parallel to the longitudinal and vertical axes and a rotor stabilized with respect to the gravity vertical for producing a second signal representative of the cosine of the heading of said craft, second resolving means mounted on said craft having a stator responsive to said first signals from the magnetometer elements arranged parallel to the transverse and vertical axes and a rotor stabilized with respect to the gravity vertical for producing a third signal representative of the sine of the heading of said craft, and means mounted on said craft responsive to said second and third signals for producing a fourth signal representative of the heading of the craft.

9. A system of the character described in claim 8, including first and second adjustable pendulous means connected respectively to said first and second resolving means for compensating for misalignment therein.

10. A heading reference system for navigable craft having longitudinal, transverse and vertical axes comprising magnetometer means mounted on said craft having three mutually perpendicular magnetometer elements; a first magnetometer element being parallel to said longitudinal axis, a second magnetometer element being parallel to said transverse axis and a third magnetometer element being parallel to said vertical axis for producing first, second and third signals representative of the components of the earth's magnetic field parallel to said longitudinal, transverse and vertical axes, respectively; first resolving means mounted on said craft having mutually perpendicular first and second stator windings and a first rotor winding; said first stator winding being connected to be responsive to the first magnetometer element and said second stator winding being connected to be responsive to the third magnetometer element; said first rotor winding being stabilized with respect to the gravity vertical and disposed normally parallel to the first stator winding and normally perpendicular to the second stator winding whereby said first rotor winding produces an output representative of the cosine of the craft's magnetic heading; second resolving means mounted on said craft having mutually perpendicular third and fourth stator windings and a second rotor winding, said third stator winding being connected to be responsive to the second magnetometer element and said fourth stator winding being connected to be responsive to the third magnetometer element; said second rotor winding being stabilized with respect to the gravity vertical and disposed normally parallel to the third stator winding and normally perpendicular to the fourth stator winding whereby said second rotor winding produces an output representative of the sine of the craft's magnetic heading, and synchro receiving means mounted on said craft responsive to the outputs of said first and second rotor windings for producing a signal representative of the heading of said craft.

11. A heading reference system for navigable craft having longitudinal, transverse and vertical axes comprising magnetometer means mounted on said craft having three mutually perpendicular magnetometer elements; a first magnetometer element being parallel to said longitudinal axis, a second magnetometer element being parallel to said transverse axis and a third magnetometer element being parallel to said vertical axis for producing first, second and third signals representative of the components of the earth's magnetic field parallel to said longitudinal, transverse and vertical axes, respectively; first resolving means mounted on said craft having mutually perpendicular first and second stator windings and a first rotor winding; said first stator winding being connected to be responsive to the first magnetometer element and said second stator winding being connected to be responsive to the third magnetometer element; said first rotor winding being disposed normally parallel to the first stator winding and normally perpendicular to the second stator winding and rotatable about a first axis in the plane defined by said first and second stator windings, said first rotor winding being arranged pendulously for maintaining it horizontal with respect to the earth when the craft pitches around the transverse axis whereby said first rotor winding produces an output representative of the cosine of the craft's magnetic heading; second resolving means mounted on said craft having mutually perpendicular third and fourth stator windings and a second rotor winding, said third stator winding being connected to be responsive to the second magnetometer element and said fourth stator winding being connected to be responsive to the third magnetometer element; said second rotor winding being disposed normally parallel to the third stator winding and normally perpendicular to the fourth stator winding and rotatable about a second axis in the plane defined by said third and fourth stator windings, said second rotor winding being arranged pendulously for maintaining it horizontal with respect to the earth when the craft rolls around the longitudinal axis whereby said second rotor winding produces an output representative of the sine of the craft's magnetic heading, synchro receiving means mounted on said craft responsive to the outputs of said first and second rotor windings for producing a signal representative of the heading of said craft.

12. A heading reference system for navigable craft having longitudinal, transverse and vertical axes comprising magnetometer means mounted on said craft having three mutually perpendicular magnetometer elements; a first magnetometer element being parallel to said longitudinal axis, a second magnetometer element being parallel to said transverse axis and a third magnetometer element being parallel to said vertical axis for producing first, second and third signals representative of the components of the earth's magnetic field parallel to said longitudinal, transverse and vertical axes, respectively; first resolving means mounted on said craft having mutually perpendicular first and second stator windings and a first rotor winding; said first stator winding being connected to be responsive to the first magnetometer element and said second stator winding being connected to be responsive to the third magnetometer element; said first rotor winding being disposed normally parallel to the first stator winding and normally perpendicular to the second stator winding and rotatable about a first axis in the plane defined by said first and second stator windings, said first rotor winding being arranged pendulously for maintaining it horizontal with respect to the earth when the craft pitches around the transverse axis whereby said first rotor winding produces an output representative of the cosine of the craft's magnetic heading; second resolving means mounted on said craft having mutually perpendicular third and fourth stator windings and a second rotor winding, said third stator winding being connected to be responsive to the second magnetometer element and said fourth stator winding being connected to be responsive to the third magnetometer element; said second rotor winding being disposed normally parallel to the third stator winding and normally perpendicular to the fourth stator winding and rotatable about a second axis in the plane defined by said third and fourth stator windings, said second rotor winding being arranged pendulously for maintaining it horizontal with respect to the earth when the craft rolls around the longitudinal axis whereby said second rotor winding produces an output representative of the sine of the craft's magnetic heading, synchro receiving means mounted on said craft having mutually perpendicular stator windings for producing a signal representative of the heading of said craft and a rotor, one of said synchro stator windings being connected to be responsive to the output of said first rotor winding and the other of said synchro stator windings being connected to be responsive to the output of said second rotor winding, a directional gyro mounted in said craft for azimuthal rotation, precessing means coupled with said gyroscope for precessing said gyro in azimuth, said synchro rotor being arranged for providing a signal corresponding to the discrepancy between the azimuthal orientation of said gyro and the azimuthal direction of the earth's magnetic field to said precessing means for slaving said gyroscope in a direction to eliminate said discrepancy, and means responsive to the azimuthal position of said gyroscope for providing a signal representative of the heading of the craft.

13. A gyromagnetic compass system for navigable craft having longitudinal, transverse and vertical axes comprising magnetometer means mounted on said craft having three mutually perpendicular magnetometer elements; a first magnetometer element being parallel to said longitudinal axis, a second magnetometer element being parallel to said transverse axis and a third magnetometer element being parallel to said vertical axis for producing first, second and third signals representative of the components of the earth's magnetic field parallel to said longitudinal, transverse and vertical axes, respectively; first resolving means mounted on said craft having mutually perpendicular first and second stator windings and a first rotor winding; said first stator winding being parallel to said longitudinal axis and connected to be responsive to the correspondingly disposed first magnetometer element and said second stator winding being parallel to said vertical axis and connected to be responsive to the correspondingly disposed third magnetometer element; said first rotor winding being disposed normally parallel to the first stator winding and normally perpendicular to the second stator winding and rotatable about a first axis parallel to said transverse axis in the plane defined by said first and second stator windings; first pendulous means mounted in said craft for rotating about said first axis and connected to said first rotor winding for maintaining the latter horizontal with respect to the earth, whereby said first rotor winding produces an output representative of the cosine of the craft's magnetic heading; second resolving means mounted on said craft having mutually perpendicular third and fourth stator windings and a second rotor winding, said third stator winding being parallel to said transverse axis and connected to be responsive to the correspondingly disposed second magnetometer element and said fourth stator winding being parallel to said vertical axis and connected to be responsive to the correspondingly disposed third magnetometer element; said second rotor winding being disposed normally parallel to the third stator winding and normally perpendicular to the fourth stator winding and rotatable about a second axis parallel to said longitudinal axis in the plane defined by said third and fourth stator windings; second pendulous means mounted in said craft for rotating about said second axis and connected to said second rotor winding for maintaining the latter horizontal with respect to the earth whereby said second rotor winding produces an output representative of the sine of the craft's magnetic heading, synchro receiving means mounted on said craft having mutually perpendicular stator windings for producing a signal representative of the heading of said craft and a rotor, one of said synchro stator windings being connected to be responsive to the output of said first rotor winding and the other of said synchro stator windings being connected to be responsive to the output of said second rotor winding, a directional gyro mounted in said craft for azimuthal rotation by means of a vertical gimbal ring, precessing means coupled with said gyroscope for precessing said gyro in azimuth, said synchro rotor being mounted on the vertical ring of said gyroscope for providing a signal corresponding to the discrepancy between the azimuthal orientation of said gyro and the azimuthal direction of the earth's magnetic field to said precessing means for slaving said gyroscope in a direction to eliminate said discrepancy, and means responsive to the azimuthal position of said gyroscope for providing a signal representative of the heading of the craft.

References Cited in the file of this patent

UNITED STATES PATENTS

| | | |
|---|---|---|
| 2,415,813 | Carry et al. | Feb. 18, 1947 |
| 2,424,562 | Fragola | July 29, 1947 |
| 2,539,411 | Esual et al. | Jan. 30, 1951 |
| 2,679,366 | Noxon | May 25, 1954 |